United States Patent
Limoges

(10) Patent No.: US 8,067,707 B2
(45) Date of Patent: Nov. 29, 2011

(54) SELF-CALIBRATING SENSOR DEVICE

(75) Inventor: Robert F. Limoges, Highland Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 640 days.

(21) Appl. No.: 12/191,535

(22) Filed: Aug. 14, 2008

(65) Prior Publication Data

US 2009/0107209 A1 Apr. 30, 2009

Related U.S. Application Data

(60) Provisional application No. 60/984,086, filed on Oct. 31, 2007.

(51) Int. Cl.
H01H 3/16 (2006.01)
H01H 21/28 (2006.01)
G01D 5/04 (2006.01)
G01P 21/00 (2006.01)

(52) U.S. Cl. .......................... 200/47; 73/1.79
(58) Field of Classification Search .................. 200/47; 73/1.79
See application file for complete search history.

(56) References Cited

U.S. PATENT DOCUMENTS

| 2,558,517 | A | * | 6/1951 | Handelman | 192/66.31 |
| 2,674,706 | A | * | 4/1954 | Knosp et al. | 200/47 X |
| 2,896,313 | A | * | 7/1959 | Brewer et al. | 73/1.79 X |
| 3,234,341 | A | * | 2/1966 | Jurczyk | 200/47 |
| 3,320,375 | A | * | 5/1967 | Aldrich et al. | 200/47 |
| 3,483,729 | A | * | 12/1969 | Sharpe | 33/502 |
| 4,604,603 | A | * | 8/1986 | Place | 337/394 |
| 4,947,674 | A | * | 8/1990 | Strain et al. | 73/1.79 |
| 5,298,700 | A | * | 3/1994 | Champagne et al. | 200/19.2 |
| 5,576,524 | A | * | 11/1996 | Strom et al. | 200/61.27 |
| 5,661,275 | A | * | 8/1997 | Marchini et al. | 200/50.01 |
| 5,773,947 | A | | 6/1998 | Torii et al. | |
| 5,875,588 | A | | 3/1999 | Torii et al. | |
| 5,920,048 | A | * | 7/1999 | Crippen et al. | 200/61.89 |
| 6,518,528 | B2 | * | 2/2003 | Nickerson et al. | 200/47 X |

FOREIGN PATENT DOCUMENTS

| DE | 102006040911 | | 3/2007 |
| EP | 316526 A1 | * | 5/1989 |
| EP | 0684452 | | 11/1995 |
| GB | 2029988 B | * | 11/1982 |
| GB | 2156157 A | * | 10/1985 |
| SU | 461903 A | * | 6/1975 |
| SU | 992349 A | * | 2/1983 |

OTHER PUBLICATIONS

International Search Report and Written Opinion for PCT/US2008/073819.

* cited by examiner

*Primary Examiner* — Thomas P Noland
(74) *Attorney, Agent, or Firm* — Mark W. Croll; Paul F. Donovan

(57) ABSTRACT

A self-calibrating sensor includes a housing, an input lever coupled to the housing and configured to contact a device to be sensed, and an actuating element configured to automatically reposition an output device to a calibrated position. The sensor also includes a cam ring that is configured to move the output device to the calibrated position based on an input received from the actuating element and a lock ring coupled to the input lever. In one exemplary embodiment, the output device is an electrical contact assembly that is slidably engaged with the cam ring. During operation, the cam ring is configured to reposition the electrical contact assembly based on the input received from actuating element.

19 Claims, 13 Drawing Sheets

SELF-CALIBRATING SENSOR DEVICE

CROSS REFERENCE TO RELATED APPLICATION

This Non-Provisional Application claims benefit to U.S. Provisional Application Ser. No. 60/984,086 filed on Oct. 31, 2007, the complete subject matter of which is expressly incorporated herein in its entirety.

BACKGROUND OF THE INVENTION

The present invention relates generally to sensors and more particularly to a sensor that is calibrated automatically. Known sensors are used to detect the rotary movement of valves or motors used in an industrial process, whereas other known sensors are used to detect the linear movement of doors, windows, etc.

Known sensors require manual adjustment or calibration to ensure that the sensor is properly positioned with respect to the object being sensed so that the sensor gives the desired output when the object being sensed is in a certain position. Typically, calibration of known sensors is accomplished using either an inherent calibration method or a measurement and adjustment method. For example, to utilize the inherent calibration method, the conventional sensor is fabricated to include various positioning features such that, when the sensor is coupled to the object being sensed, the positional relationship between the sensor and the object being sensed is sufficiently accurate without any further adjustment. The second method, measurement and adjustment, may be accomplished by positioning the sensor so that the sensor and the object to be sensed are in contact. The sensor is then adjusted until the sensor's desired output is obtained at this predetermined position. Optionally, the sensor is set to the desired output and the sensor is repositioned to ensure that it is in contact with the object to be sensed.

The above described sensors and methods of installation each require that an operator have sufficient manual dexterity to position the sensor. The known sensors may also require that an additional device, e.g. a spacer, be installed to position the sensor. Known sensors also require the operator to have sufficient knowledge and tools or instruments to measure and adjust the sensor to achieve the desired output for a given position.

Thus, a need exists for an improved sensor that is accurate, consistent, and operates with minimal opportunity for human error. Preferably, such a sensor permits calibrating the physical relationship between the object to be sensed and the sensor without using any tools. Additionally, a need exists to provide a sensor that may be installed and calibrated in a shorter period of time than other known sensors allow, and to enable the operator to install the sensors with relatively little training. A need also exists for a sensor that permits easy and quick visual verification that the sensor has been calibrated.

BRIEF DESCRIPTION OF THE INVENTION

In one embodiment, a self-calibrating sensor assembly is provided. The self-calibrating sensor assembly includes an input device in contact with a device to be sensed and an output device coupled to a sensor output. The self-calibrating sensor mechanism also includes an actuating element coupled to a linkage assembly between the input and output devices. The actuating element is configured to automatically change the sensor output to the desired value with the input device in any chosen position within its range of motion, when the operator applies and removes pressure to the actuating element.

The sensor mechanism permits calibrating the physical relation between the object to be sensed and the sensor without using any tools. The sensor mechanism also allows calibration to be accomplished in a shorter period of time than other known methods. The sensor mechanism permits an individual to accomplish calibration with minimal training, thus enabling field personnel or end-users to install or replace the sensors. Additionally, the sensor mechanism permits easy and rapid visual verification that auto-calibration of the sensor has been accomplished.

Other features and advantages of the invention will become apparent to those skilled in the art upon review of the following detailed description, claims and drawings in which like numerals are used to designate like features.

Figure 1:
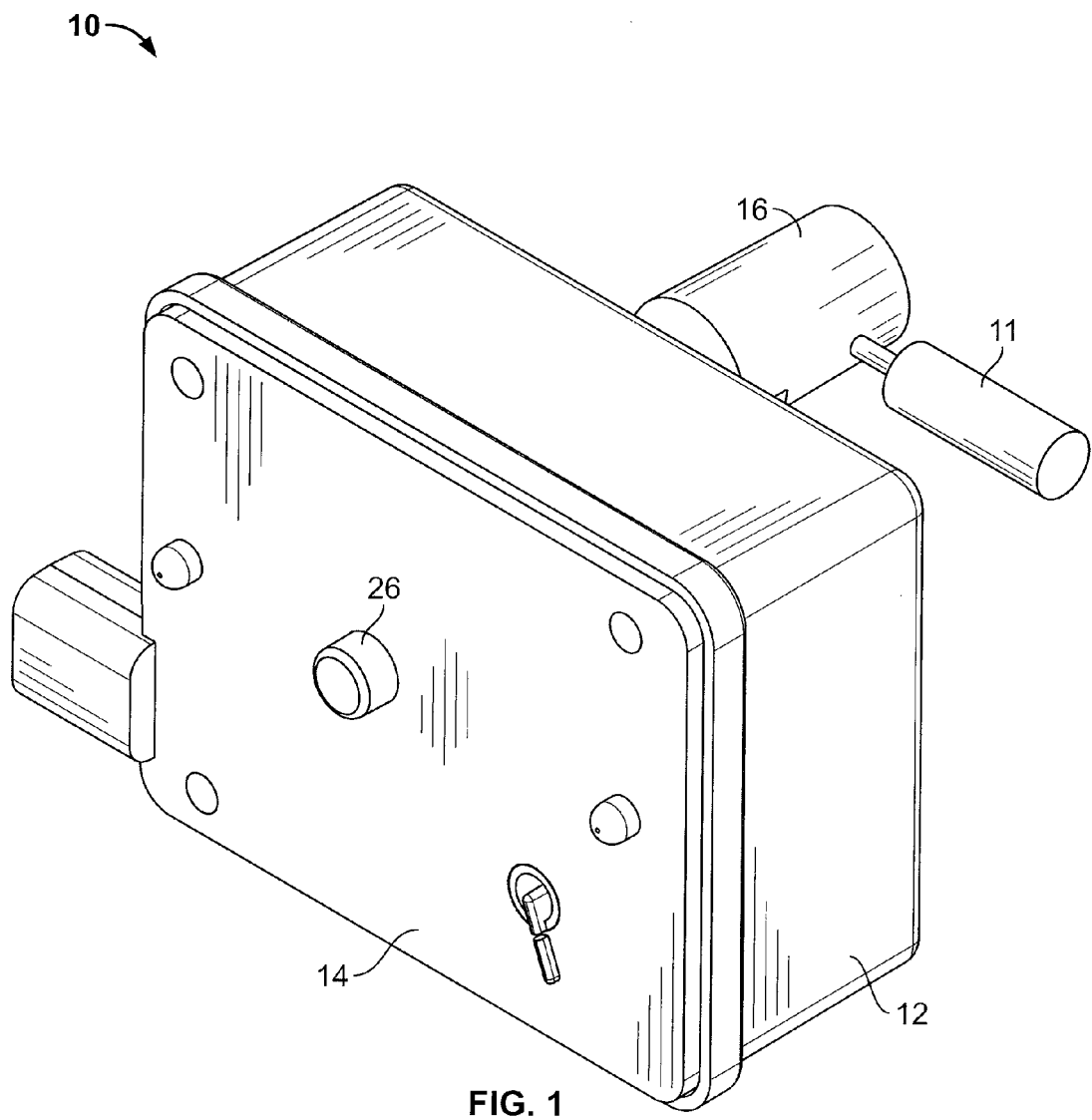
FIG. 1 is a perspective view of an exemplary sensor in accordance with an embodiment of the present invention, showing the device 11 to be sensed.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 is a perspective view of an exemplary sensor 10 in accordance with an embodiment of the present invention. The sensor 10 includes a housing 12, an input lever arm 16, and an actuating element 26. In the exemplary embodiment, sensor 10 is configured to function as a limit switch. During operation, the sensor 10 detects movement of a surface in a specified direction from a neutral or rest position using the lever arm 16. The sensor 10 detects a slight movement in the specified direction and opens an electrical circuit that is described below. When the object to be sensed is in the neutral position, or in a position in the opposite direction of that to be sensed, the electrical circuit is closed. Sensor 10 is also configured to sense the rest position of the surface of a variety of devices in relation to the sensor mounting position, from assembly to assembly, thus allowing the sensor to auto-calibrate automatically to any device. In the exemplary embodiment, sensor 10 is calibrated automatically by depressing and releasing the exposed end of the actuating element 26.

Figure 2:
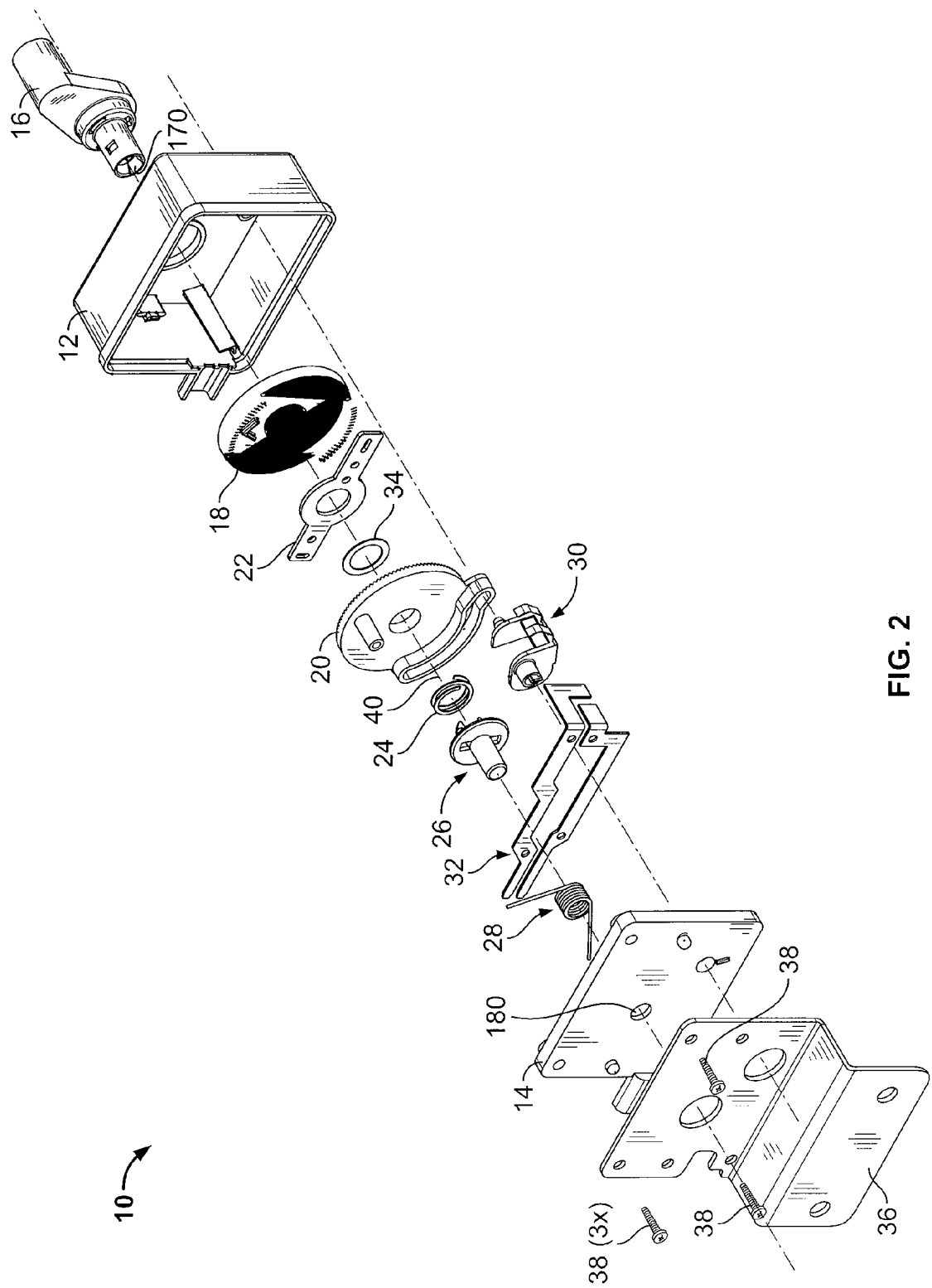
FIG. 2 is an exploded view the exemplary sensor shown in FIG. 1 in accordance with an embodiment of the present invention.

FIG. 2 is an exploded view of the self-calibrating sensor 10 shown in FIG. 1 in accordance with an embodiment of the present invention. As shown in FIG. 2, the sensor 10 includes the housing 12 to provide structural and/or rotational support to the various components described below. The sensor 10 also includes a removable cover 14 that couples to the housing 12. The cover 14 is configured to secure and protect the various components installed within the housing 12 and to provide structural and/or rotational support for components. The sensor 10 also includes the input lever 16, a lock ring 18, and a cam ring 20. The sensor 10 also includes a thrust plate 22 that is disposed between the lock ring 18 and the cam ring 20. The thrust plate 22 is configured to couple to the housing 12 as will be discussed below. The sensor 10 also includes a Teflon washer 34, a compression spring 24, the actuating element 26, a torsion spring 28, an output device, e.g. a movable electrical contact assembly 30, a pair of electrical conductors 32, a mounting bracket 36 and a plurality of screws 38. Each of the components within housing 12 is oriented with respect to a centerline axis 40. The screws 38 secure the mounting bracket 36 and the cover 14 to the housing 12. Features on the mounting bracket 36, the cover 14 and the housing 12 align these parts to each other in directions perpendicular to the centerline axis 40. The operation of sensor 10 is discussed below.

Figure 3:
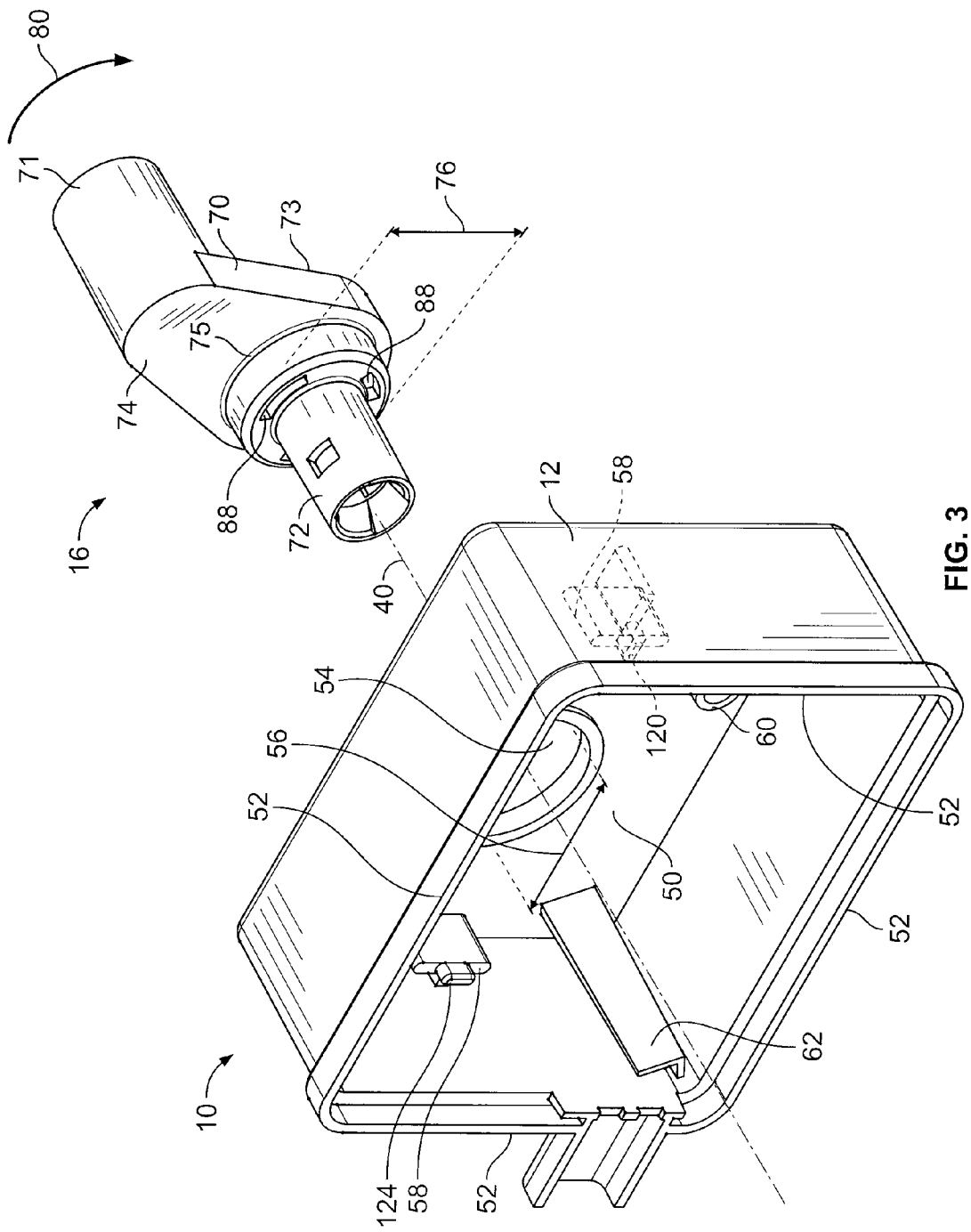
FIG. 3 is a perspective view of the input lever and of the housing shown in FIG. 2 in accordance with an embodiment of the present invention.

FIGS. 3-14 illustrate the various components included in the sensor 10 in more detail. For example, FIG. 3 is a perspective view of the input lever 16 aligned with respect to the housing 12 each shown in FIG. 2 in accordance with an embodiment of the present invention. In the exemplary embodiment, the housing 12 includes a backside 50 and a plurality of sides 52 that are each coupled to the backside 50. In the exemplary embodiment, the backside 50 and the sides 52 form a substantially square housing 12. It should be realized that the shape of housing 12 is exemplary and that the backside 50 and sides 52 may be coupled together to form a shape that is other than rectangular. For example, the housing 12 may have a circular shape, a pentagon shape, etc. The housing 12 has an opening 54 that extends through the backside 50. The opening 54 has a diameter 56 that is sized to receive a portion of the input lever 16 as will be discussed below. The housing 12 also includes a pair of retainers 58 that are configured to secure the thrust plate 22 (shown in FIG. 1) in a fixed position within the housing 12.

The housing 12 also includes a bearing 60 that is used for mounting the movable contact assembly 30 (shown in FIG. 1), and a post 62 that is configured to provide a fixed surface for one leg of the torsion spring 28 (shown in FIG. 2) to push against. In the exemplary embodiment, the retainers 58, the bearing 60, and the post 62 are formed unitarily with the housing 12. Optionally, the retainers 58, the bearing 60, and the post 62 may be coupled to the housing 12 using a welding or brazing procedure, for example.

The input lever 16 includes a body 70, an input lever arm 71, and an input lever shaft 72. In the exemplary embodiment, the input lever 16 is fabricated as a unitary component to include the body 70, the lever arm 71, and the input lever shaft 72. The lever arm 71 is formed on a first side 73 of the body 70 and the input lever shaft 72 is formed on an opposite side 74 of the body 70. In the exemplary embodiment, the lever arm 71 is shown as a substantially round tube having a rotational axis that is parallel to the axis of the rotation 40 of the input lever 16. As shown in FIG. 3, the lever arm 71 is mounted to the radially outer end of the arm 70. During operation, the lever arm 71 contacts the surface of an object being sensed, e.g. device 11 (shown in FIG. 1), to detect motion of the device 11. In the exemplary embodiment, the motion of the object being sensed causes the lever arm 71 to move or rotate, thus causing the input lever shaft 72 to rotate. Additionally, the input lever shaft 72 serves as a pivot and guide for rotational motion and transmits rotational force to other components inside the sensor 10 as will be discussed below. The input lever 16 also includes a circular flange 75 that extends radially around the input lever shaft 72. As shown in FIG. 3, the flange 75 is disposed proximate to the body 70. The flange 75 has an outer diameter 76 that is approximately equal to the diameter 56 of opening 54 to enable the flange 75 to be inserted into the opening 54 of the housing 12. During operation, the flange 75 is configured to rotate within the opening 54. Accordingly, the housing 12 functions as a bearing for the input lever shaft 72 and thus the input lever 16.

Figure 4A:
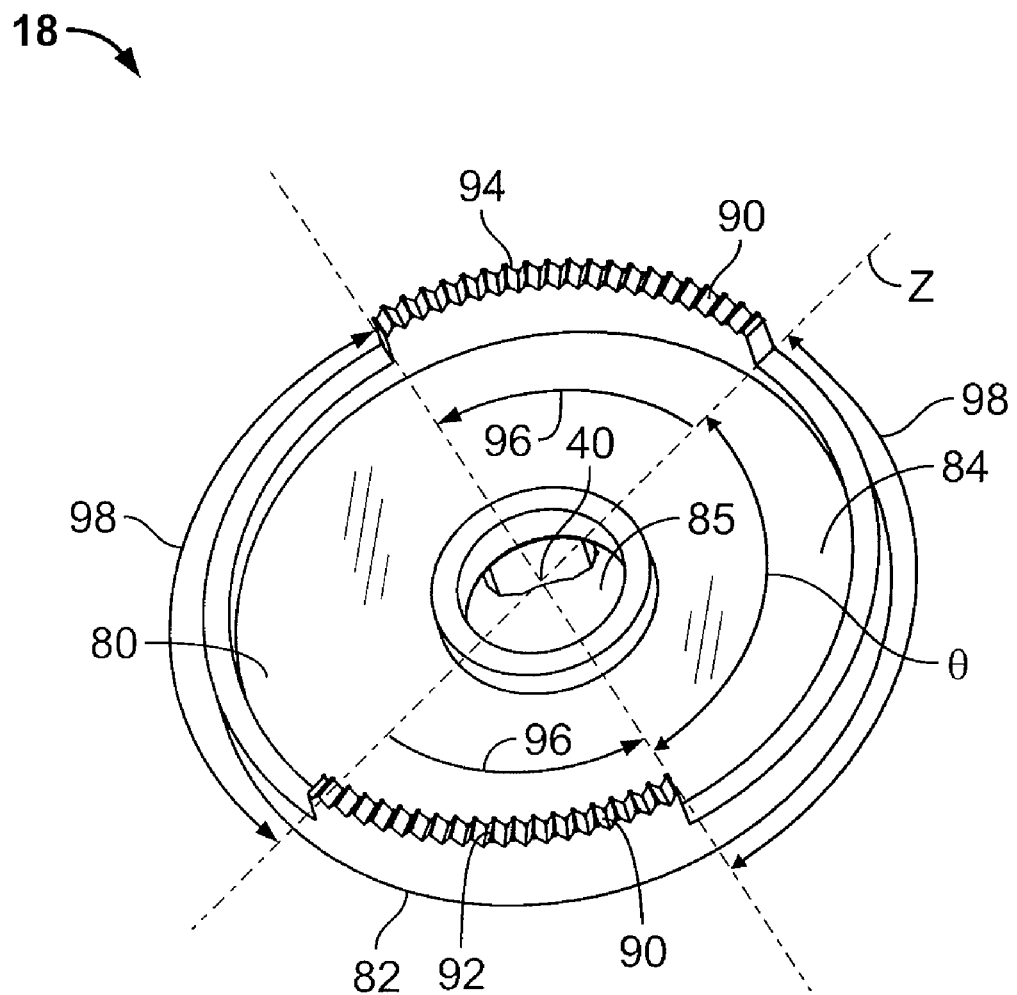
FIG. 4A is a back perspective view of the lock ring shown in FIG. 2 in accordance with an embodiment of the present invention.
Figure 4B:
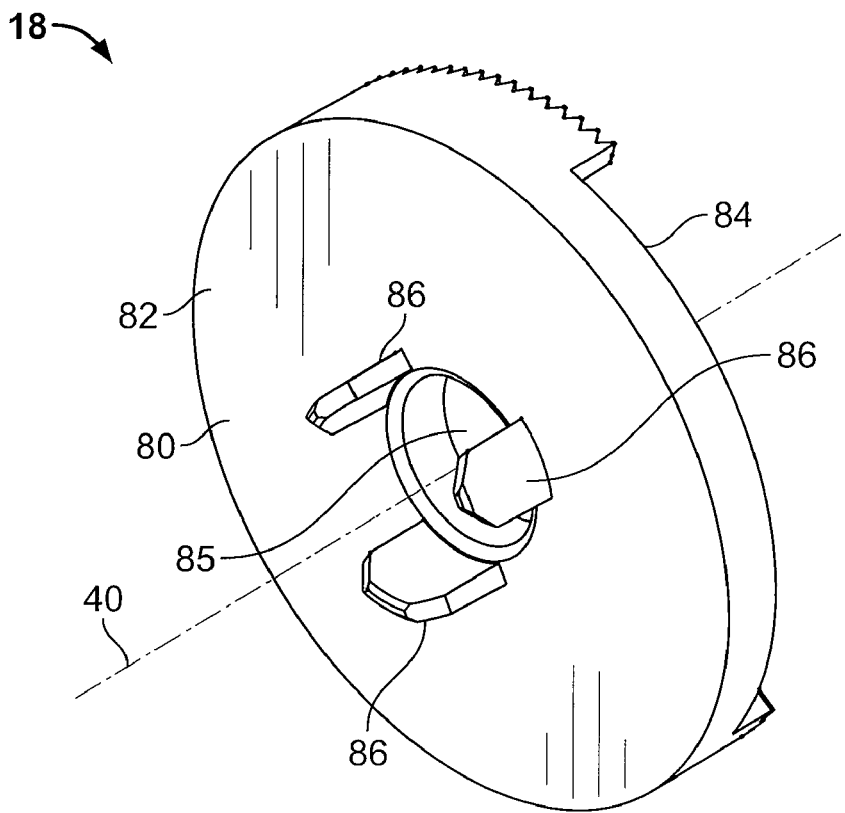
FIG. 4B is a front perspective view of the lock ring shown in FIG. 4A.

FIG. 4A is a back perspective view of the lock ring 18 shown in FIG. 2 in accordance with an embodiment of the present invention. FIG. 4B is a front perspective view of the lock ring 18 shown in FIG. 4A. In the exemplary embodiment, the lock ring 18 includes a substantially circular body portion 80 having a first side 82, an opposite second side 84, and an opening 85 extending therethrough. The opening 85 has a diameter that is greater than the diameter of the input lever shaft 72 to enable the input lever shaft 72 to be inserted at least partially through the opening 85. As shown in FIG. 4B, the lock ring 18 also includes a plurality of tabs 86 extending outwardly from the first side 82. The tabs 86 are sized to be received within a corresponding plurality of receptacles 88, shown in FIG. 3, that are formed in the input lever 16. In the exemplary embodiment, the lock ring 18 includes three tabs 86 that are spaced equidistantly around the centerline axis 40, and the input lever includes three receptacles 88, wherein each receptacle 88 is sized to receive a respective tab 86. The tabs are not all the same size, however. During assembly, the tabs 86 are inserted into respective receptacles 88 and cause the lock ring 18 to rotate with the input lever 16. The tabs can be assembled to the receptacles in only one orientation, which assures proper rotational orientation of the input lever 16 and the lock ring 18.

Referring again to FIG. 4A, the lock ring 18 also includes a plurality of teeth 90 that are attached to the second side 84 proximate to the radially outer edge of the lock ring 18. The teeth 90 are disposed on the periphery of the second side 84 of the lock ring 18, facing away from the input lever 16. In the exemplary embodiment, the lock ring 18 includes a first plurality of teeth 92 that extend in a counter-clockwise direction from a Z-axis an angular distance 96 and a second plurality of teeth 94 that extend in a counter-clockwise direction from the Z-axis the angular distance 96. As shown in FIG. 4A, the teeth 92 are separated from the teeth 94 by an angular distance 98. In the exemplary embodiment, the distance 98 is predetermined based on the rotational movement of the input lever 16. The distance 98 must be sufficient to allow the lock ring to rotate through an angle equal to the rotational movement of the input lever 16 but not interfere with either of the arms 112 or 114 on the thrust plate 22.

Referring again to FIG. 2, during assembly, the lock ring 18 is coupled to the input lever 16 such that the second side 84 of the lock ring 18 is normal to the axis of rotation 40 of the input lever shaft 72. Specifically, a centerline of the lock ring 18 is coincident with the centerline of the input lever shaft 72. During fabrication, the lock ring 18 is rigidly coupled to the input lever 16 such that the lock ring 18 rotates with the input lever 16 and retains the input lever 16 in the housing 12.

Figure 5:
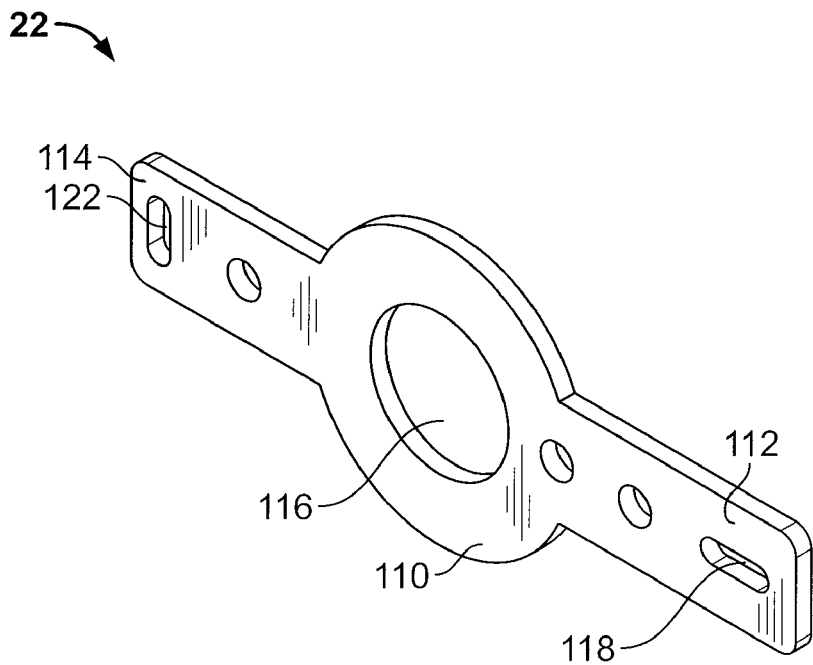
FIG. 5 is a back view of the exemplary thrust plate shown in FIG. 2 in accordance with an embodiment of the present invention.

FIG. 5 is a back view of the exemplary thrust plate 22 shown in FIG. 2 in accordance with an embodiment of the present invention. As shown in FIG. 2, the thrust plate 22 is disposed between the lock ring 18 and the cam ring 20. The thrust plate 22 includes a body portion 110, a first arm 112, and a second arm 114 that are each coupled to the body portion 110. In the exemplary embodiment, thrust plate 22 is fabricated as a unitary component to include the body portion 110 and the arms 112 and 114. The body portion 110 also includes an opening 116 that has a diameter that is greater than the diameter of the input lever shaft 72 to enable the input lever shaft 72 to be inserted at least partially through the opening 116. In the exemplary embodiment, the thrust plate 22 is fabricated from steel. Optionally, the thrust plate 22 may be fabricated from any rigid material.

The thrust plate 22 is supported by the housing 12, shown in FIG. 3. In the exemplary embodiment, first arm 112 has a non-circular or oval-shaped opening 118 extending therethrough that is configured to be received on a first retainer 120 of the pair of retainers 58, shown in FIG. 3. The second first arm 114 also has a non-circular or oval-shaped opening 122 extending therethrough that is configured to be received on a second retainer 124 of the pair of retainers 58 shown in FIG. 3. As shown in FIG. 5, the first opening 118 is disposed approximately perpendicular to the second opening 122 to facilitate limiting the movement of the thrust plate 22 when installed in the housing 12. During operation, the thrust plate 22 is configured to limit the axial movement of the cam ring 20.

Figure 6A:
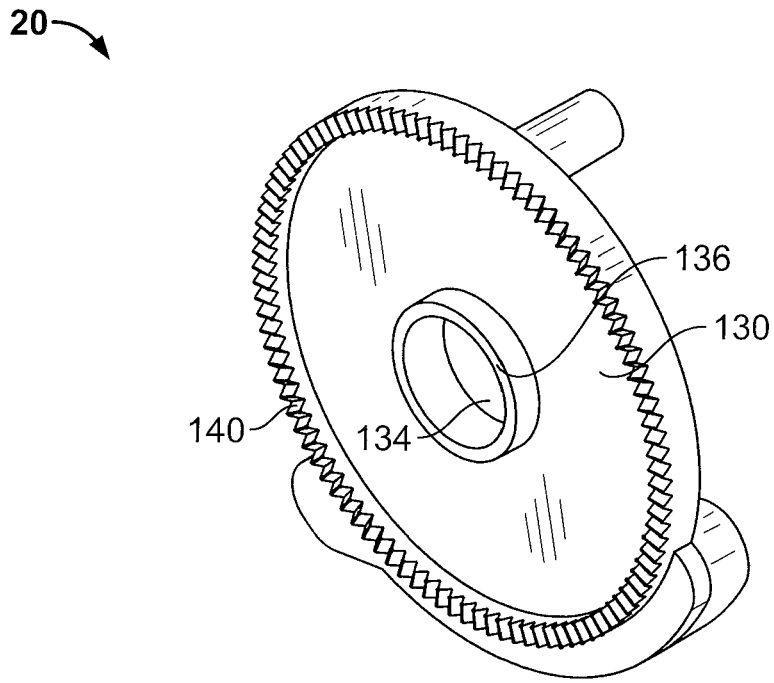
FIG. 6A is a front perspective view of the cam ring shown in FIG. 2 in accordance with an embodiment of the present invention.
Figure 6B:
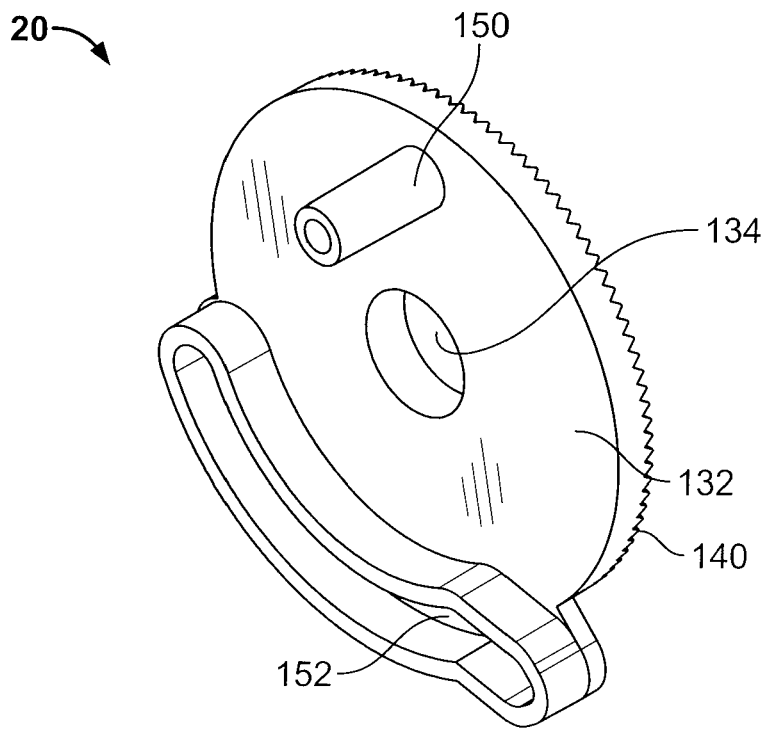
FIG. 6B is a back perspective view of the cam ring shown in FIG. 6A.

FIG. 6A is a front perspective view of the cam ring 20 shown in FIG. 2 in accordance with an embodiment of the present invention. FIG. 6B is a back perspective view of the cam ring 20 shown in FIG. 6A. The cam ring 20 has an axis of rotation that is coincident with the axis of rotation of the input lever 16, e.g. centerline axis 40 (FIGS. 2 & 3). The cam ring 20 includes a first side 130, an opposite side 132, and an opening 134 extending therethrough that is a close fit to the input lever shaft 72 and a bearing face 136. Specifically, the opening 134 has an inner diameter that is substantially similar to the outer diameter of the input lever shaft 72 to enable the input lever shaft 72 to be friction fit within the opening 134.

Referring to FIG. 6A, the cam ring 20 also includes a plurality of teeth 140 that are attached to the first side 130 proximate to the radially outer edge of the cam ring 20 facing toward the input lever 16. In the exemplary embodiment, the teeth 140 extend 360 degrees around the first side 130. Moreover, the cam ring teeth 140 are configured to mesh with the lock ring teeth 90 shown in FIG. 4A. It should be realized that the quantity, the size, and the spacing of the teeth 90 and 140 is predetermined based on the tolerances determined for the rotary orientation of the lock ring 18 to the cam ring 20. For example, in one embodiment, the cam ring 20 may include 360 teeth 140 such that the cam ring 20 is capable of being adjusted relative to the lock ring 18 in one degree increments. To further increase the adjustment resolution, the quantity of teeth 140, may be increased to 720, for example, such that the cam ring 20 is capable of adjustment in one-half degree increments. As shown in FIG. 6B, the second side 132 of the cam ring 20 also includes a spring post 150 and a cam track 152 which are discussed in more detail below.

Figure 7:
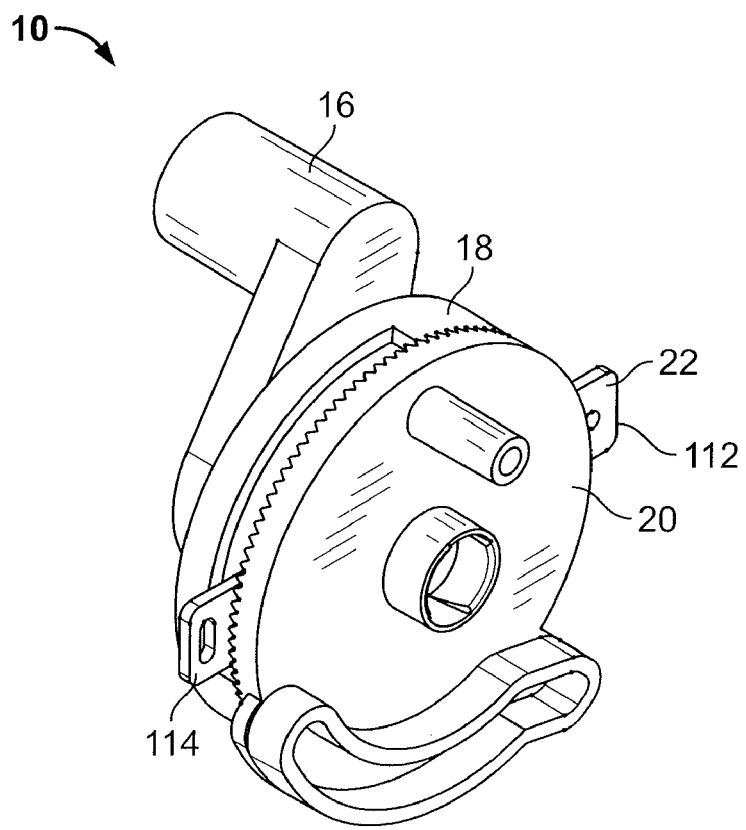
FIG. 7 is a perspective of a portion of the sensor shown in FIG. 2 in accordance with an embodiment of the present invention.

FIG. 7 is a perspective of a portion of sensor 10 that illustrates the coupling arrangement of the input lever 16, the lock ring 18, the cam ring 20, and the thrust plate 22. As shown in FIG. 7, each respective arm 112 and 114, of the thrust plate 22, is configured to extend through respective gap defined between the teeth 90.

Figure 8:
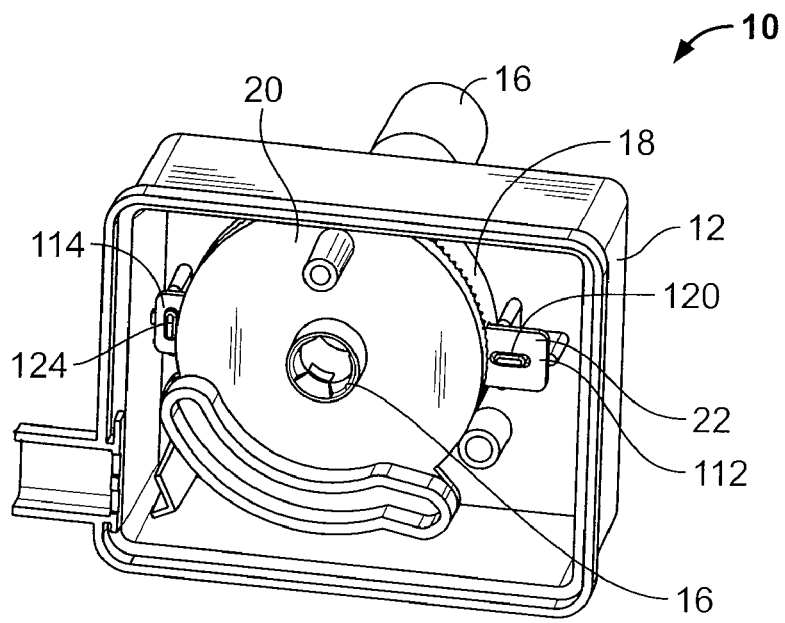
FIG. 8 is the portion of the sensor shown in FIG. 7 installed in the housing shown in FIGS. 2 & 3.

FIG. 8 is a perspective view of the portion of sensor 10 shown in FIG. 7 installed within the housing 12. As shown in FIG. 8, the thrust plate 22 is supported by the housing 12. More specifically, during assembly the first arm 112 is secured to the first retainer 120 and the second arm 114 is secured to the second retainer 124 to facilitate limiting the movement of the thrust plate 22 when installed in the housing 12 and to limit the axial movement of the cam ring 20.

Figure 9:
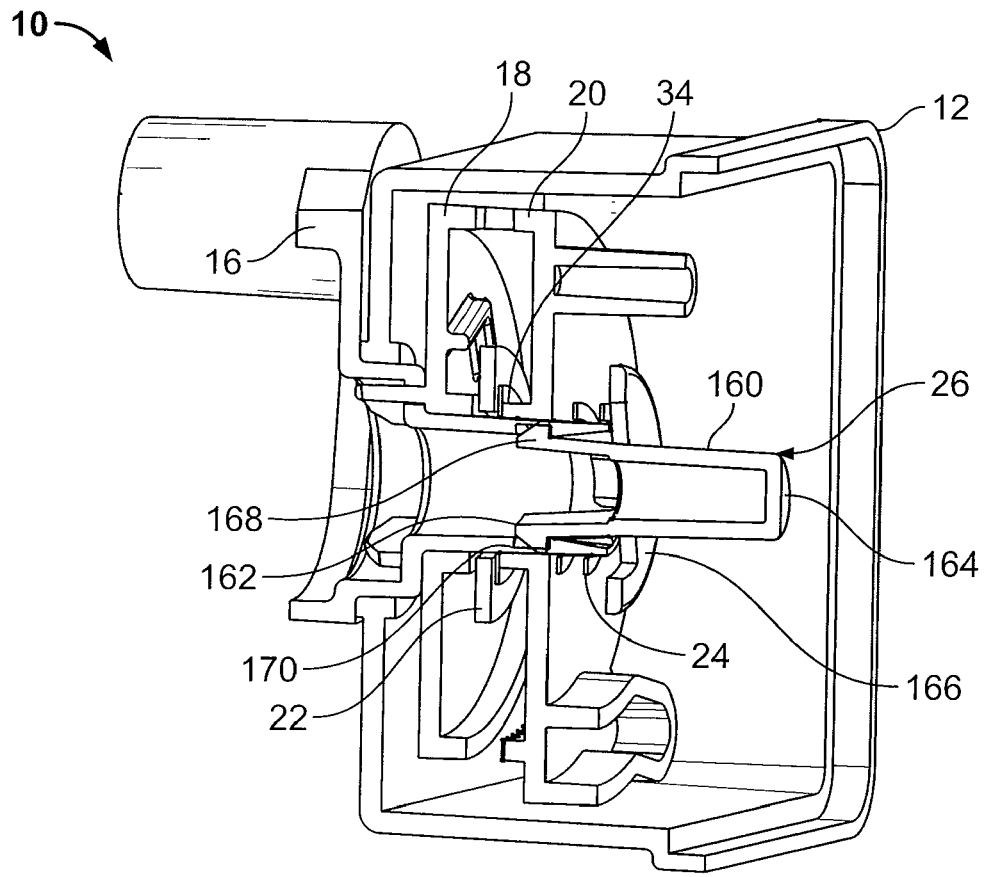
FIG. 9 is a section view of the sensor shown in FIG. 1 in accordance with an embodiment of the present invention.

FIG. 9 is a section view of a portion of the sensor assembly 10 shown in FIG. 1 installed in the housing 12 in accordance with an embodiment of the present invention. In the exemplary embodiment, the sensor 10 also includes the spring 24 and the actuating element 26. In the exemplary embodiment, the spring 24 is a compression spring that is positioned between the cam ring 20 and the actuating element 26. The compression spring 24 is a helical spring that is configured to force the lock ring 18 to engage the cam ring 20 during one mode of operation. Specifically, during one mode of operation the compression spring 24 moves the cam ring 20 toward the lock ling 18 until the cam ring teeth 140 engage with the lock ring teeth 90 thus engaging the cam ring 20 with the lock ring 18. In this operational configuration, any movement of the lock ring 18 causes the cam ring 20 to move, thus fixing the rotational relationship between the lock ring 18 and the cam ring 20. Interposed between the bearing face 136 on the cam ring 20 and the thrust plate 22 is a Teflon washer 34, to reduce rotary friction between the cam ring 20 and the thrust plate 22.

In the exemplary embodiment, the actuating element 26 includes a body portion 160 having a first end 162, a second end 164, and a flange 166 disposed between the first and second ends 162 and 164. The actuating element 26 also includes at least one clip 168 that is disposed proximate to the first end 162. In the exemplary embodiment, the clip 168 is configured to mate with a corresponding receptacle 170 that is formed in the input lever 16. More specifically, during assembly, the compression spring 24 is positioned on the actuating element 26 between the first end 162 and the flange 166. The actuating element 26 is then pushed into the input lever 16 until the clip 168 is snap fit into the receptacle 170. The clip 168 and the receptacle 170 facilitate ensuring that the actuating element 26 remains coupled to the input lever 16 during operation.

During operation, the actuating element 26 positions the compression spring 24 with respect to the input lever 16. In the exemplary embodiment, a portion of the actuating element 26, e.g. second end 164, projects through an opening 180 (shown in FIG. 2) that is defined through the cover 14. During operation, the actuating element 26 also functions as an extension of the input lever 16. Moreover, the cover opening 180 (FIG. 2) is sized to receive the actuating element 26 therethrough and acts as a bearing for rotational motion of the actuating element 26.

Figure 10:
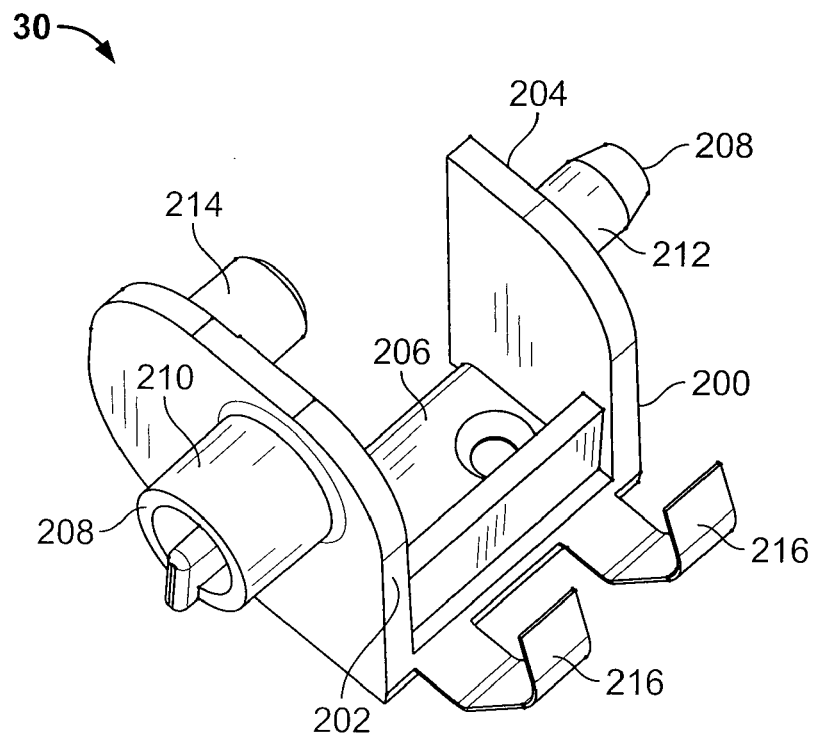
FIG. 10 is a perspective view of a portion of the sensor shown in FIG. 2 in accordance with an embodiment of the present invention.

FIG. 10 is a perspective view of the exemplary movable contact assembly 30 shown in FIG. 2. In the exemplary embodiment, the movable contact assembly 30 includes a generally U-shaped body 200 having a first side 202, a second side 204, and an end 206 that is coupled between the first and second sides 202 and 204, respectively, to form the U-shape. The movable contact assembly 30 also includes a two-part axle 208 that includes a first axle portion 210 that is coupled to and extends outwardly from the first side 202, and a second axle portion 212 that is coupled to and extends outwardly from the second side 204 such that a gap is defined between the axle portions 210 and 212. The movable contact assembly 30 also includes a cam follower post 214 that is coupled to and extends inwardly from the first side 202, and a pair of electrical contacts 216 that are coupled to the contact assembly end 206. In this embodiment, body 200 is molded around contact 216. It should be realized that the electrical contacts 216 are adapted to function as part of an electrical circuit and are formed as a single piece of metal.

Figure 11A:
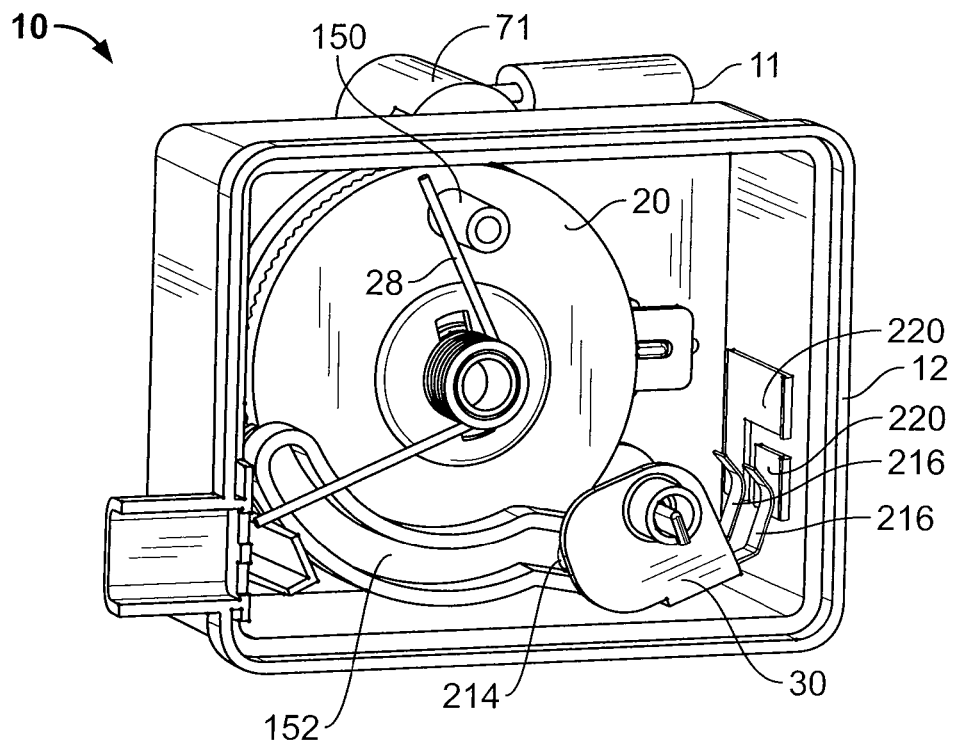
FIG. 11A is a perspective view of the portion of sensor shown in FIG. 10 in a first operational position.
Figure 11B:
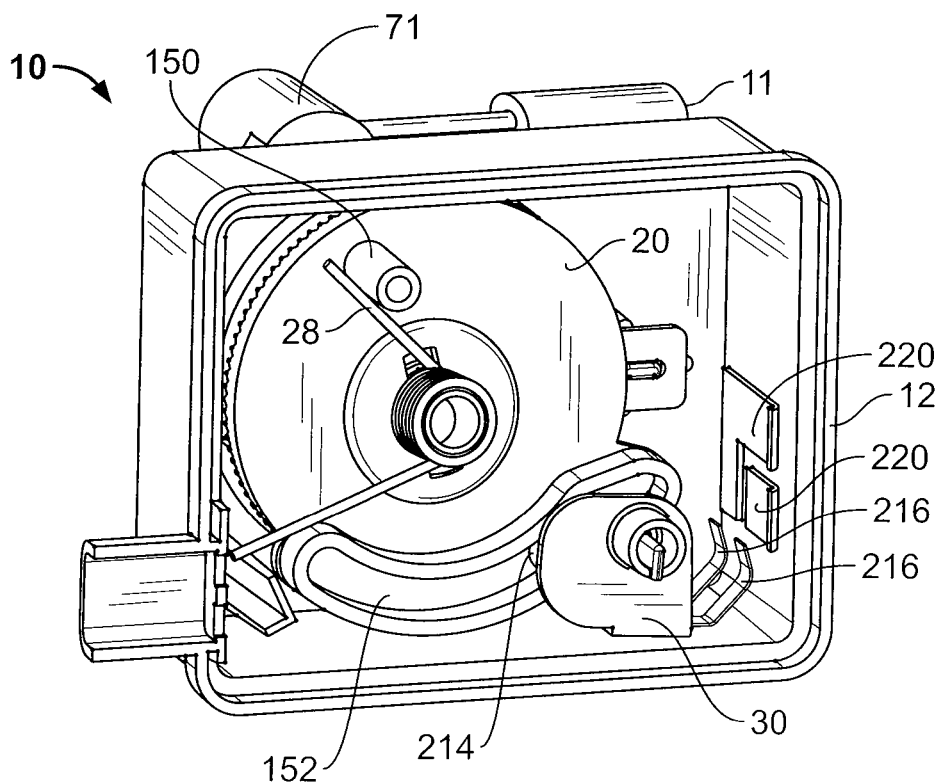
FIG. 11B is a perspective view of the portion of sensor shown in FIG. 10 in a second operational position.

FIG. 11A is a perspective view of the sensor assembly 10 in a first operational position. FIG. 11B is a perspective view of the sensor assembly 10 in a second operational position. As shown in FIGS. 11A and 11B, the cam follower post 214 is configured to be inserted into the cam track 152 formed on the cam ring 20. During operation, rotation of the cam ring 20 causes the cam follower post 214 to move, thus causing the electrical contacts 216 either to mate with a corresponding pair of contacts 220 to form an electrical circuit or to break from the corresponding pair of contacts 220 to break the electrical circuit. In the exemplary embodiment, the pair of contacts 220 are mounted on an interior surface of the housing 12. The housing is non-conductive, so the contacts 220 are electrically isolated from each other, unless connected by contacts 216. The sensor 10 also includes the torsion spring 28 that is mounted on the cam actuating element 26. The torsion spring 28 preloads the cam ring 20 in a clockwise direction, as seen in FIGS. 11A and 11B.

During a first mode of operation, when the actuating element 26 is depressed (FIG. 13A), the cam ring 20 is decoupled from the lock ring 18 and the torsion spring 28 forces the cam ring 20 to the clockwise limit of its travel by pushing on the post 150. The Teflon washer 34 between the thrust plate 22 and the cam ring 20 minimizes rotational friction between the thrust plate 22 and the cam ring 20. Additionally, when the cam ring 20 rotates to the clockwise limit of its travel, as seen from the rear of the sensor 10, the cam track 152 causes the movable contact assembly 30 to rotate until it shorts across the pair of contacts 220, thus closing the switch. This position of the sensor 10 is referred to herein as the home position. Releasing the actuating element 26 (FIG. 13B) allows the compression spring 24 to force teeth 140 and 90 to mesh, which locks the angular orientation between the lock ring 18 and the cam ring 20. If the input lever arm 71 on the input lever 16 is positioned against the device 11 being sensed, and the actuating element 26 is pressed and released, the switch contacts will be closed whenever the input lever arm 71 is in this position. Furthermore, the clockwise (as seen from the sensor 10 rear) motion limit of the input lever arm 71 will be this position. After these actions have been carried out by the operator, the sensor 10 shall be said to be auto-calibrated.

As shown in FIG. 11B, during a second mode of operation, movement of device 11 towards the lever arm 71 moves the lever arm 71, rotates the lever shaft 72 and causes the cam ring 20 to rotate counter-clockwise. That motion causes the cam track 152 to rotate the movable contact assembly 30 until it breaks contact with the pair of contacts 220 thus opening the switch. The cam track 152 is configured to allow a relatively large over-travel in the counter-clockwise direction, as seen from the rear of the sensor in FIG. 11B.

Figure 12:
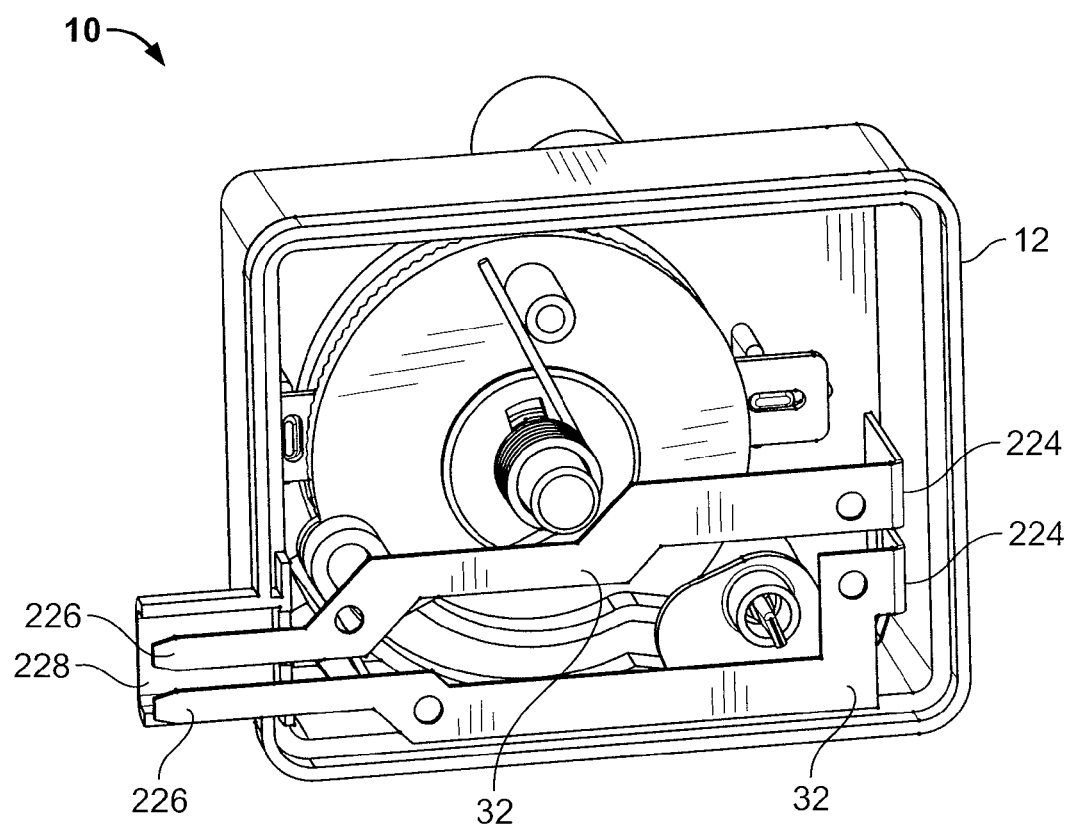
FIG. 12 is a perspective of another portion of the sensor shown in FIG. 2 in accordance with an embodiment of the present invention.

FIG. 12 is a perspective view of the electrical conductors 32 shown in FIG. 2 installed within the housing 12. In the exemplary embodiment, sensor 10 includes two electrical conductors 32 that are each coupled to respective fixed electrical contacts 220 shown in FIGS. 11A and 11B. It should be realized that the sensor 10 may includes any quantity of electrical contacts 216 and respective electrical conductors 32 and the electrical contacts illustrated in the figures is exemplary. As shown in FIG. 12, the electrical conductors 32 each include a first end 224 that is coupled or soldered to a respective electrical contact 220 and a second end 226. The second ends 226 extend through an opening 228 formed in the housing 12 and enable the output signals generated by sensor 10 to be transmitted to a remote location. In this embodiment, for each contact 32, the electrical contact 220, first end 224 and second end 226 are fabricated as one single piece of conductive material.

Figure 13A:
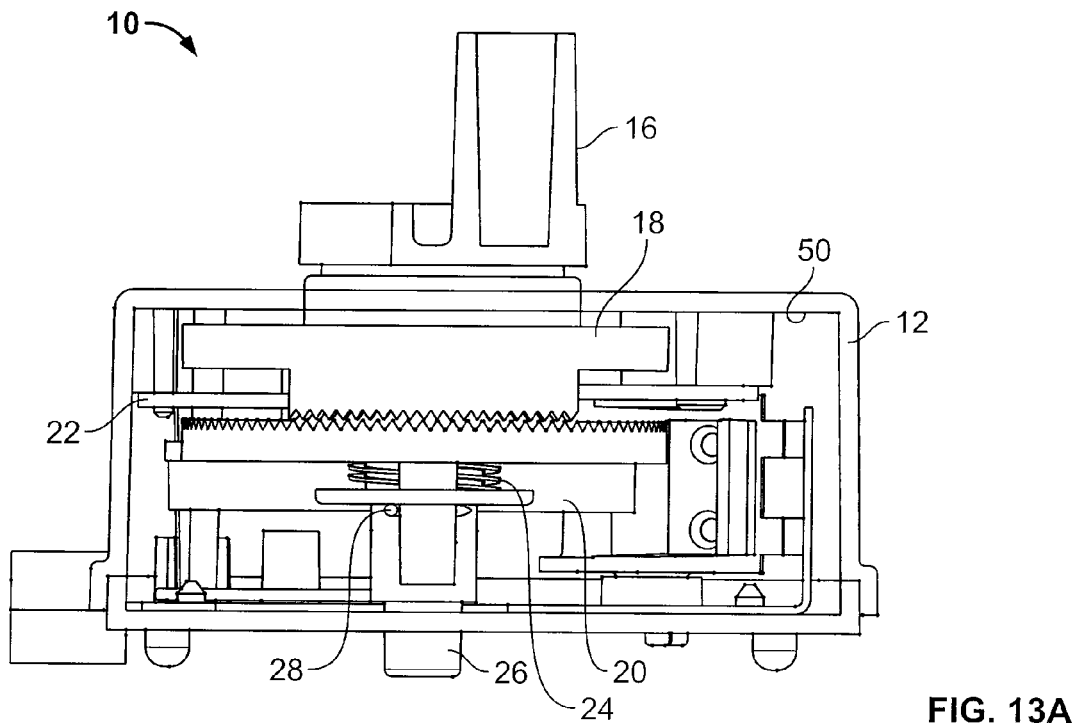
FIG. 13A is a section view of the sensor shown in FIG. 12 during auto calibration.
Figure 13B:
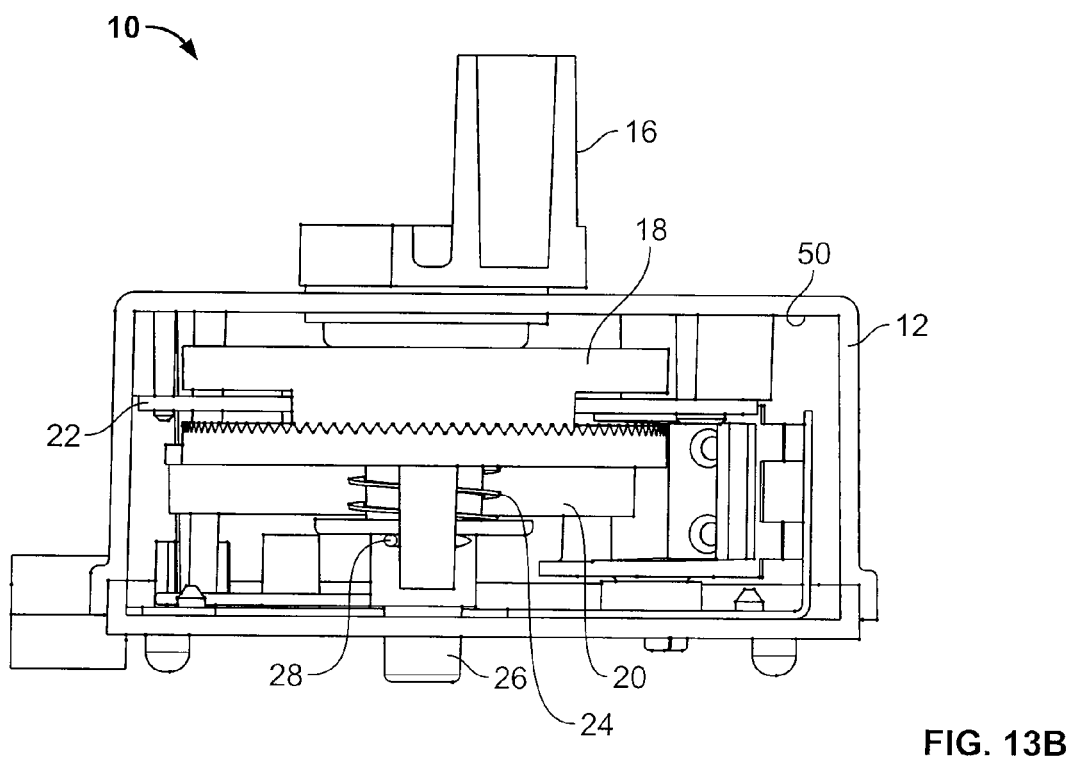
FIG. 13B is a section view of the sensor shown in FIG. 12 before and after auto calibration.

FIG. 13A is a cross-section view of the sensor assembly 10 in the first operational position. FIG. 13B is a cross-section view of the sensor assembly 10 in the second operational position. During the first mode of operation, depressing the exposed end of the actuating element 26 causes the input lever 16 to move outward from the backside 50 and also causes the lock ring 18 and the cam ring 20 to move toward the backside 50 of housing 12. The thrust plate 22 allows the cam ring 20 to move only a short distance axially, but does not limit the axial motion of the lock ring 18. Specifically, when the exposed end of the actuating element 26 is depressed, the cam ring 20 and the lock ring 18 separate, or become disengaged, allowing the cam ring 20 to rotate freely with respect to the lock ring 18. As discussed above, the torsion spring 28 preloads the cam ring 20 in the clockwise direction, as seen from the rear of the sensor 10. When the actuating element 26 is depressed, the cam ring 20 is decoupled from the lock ring 18 and the torsion spring 28 forces the cam ring 20 to the clockwise limit of its travel, e.g. the home or calibrated position for sensor 10.

During a second mode of operation, shown in FIG. 13B, removing or releasing the pressure from the exposed end of the actuating element 26 allows the compression spring 24 to expand and pull the lock ring 18 into engagement with the cam ring 20, e.g. causing the lock ring teeth 90 to engage the cam ring teeth 140. Thus the cam ring 18 is fixed rotationally with respect to the lock ring 18 in a calibrated orientation.

Figure 14A:
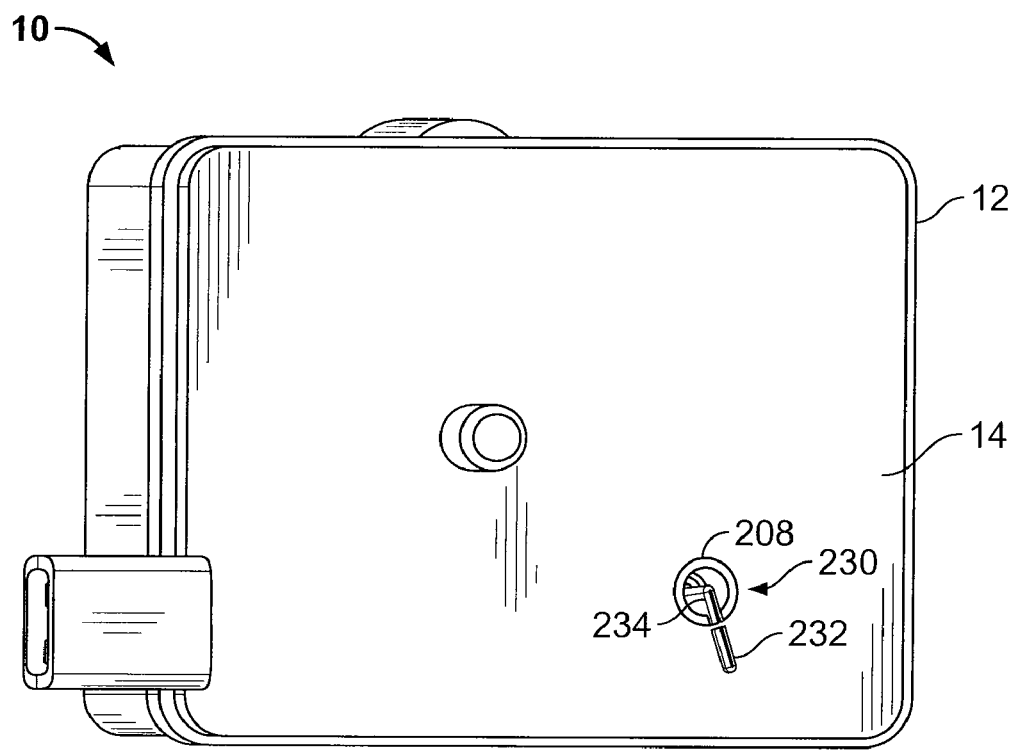
FIG. 14A is a back view of the sensor shown in FIG. 1 in a first operational position.
Figure 14B:
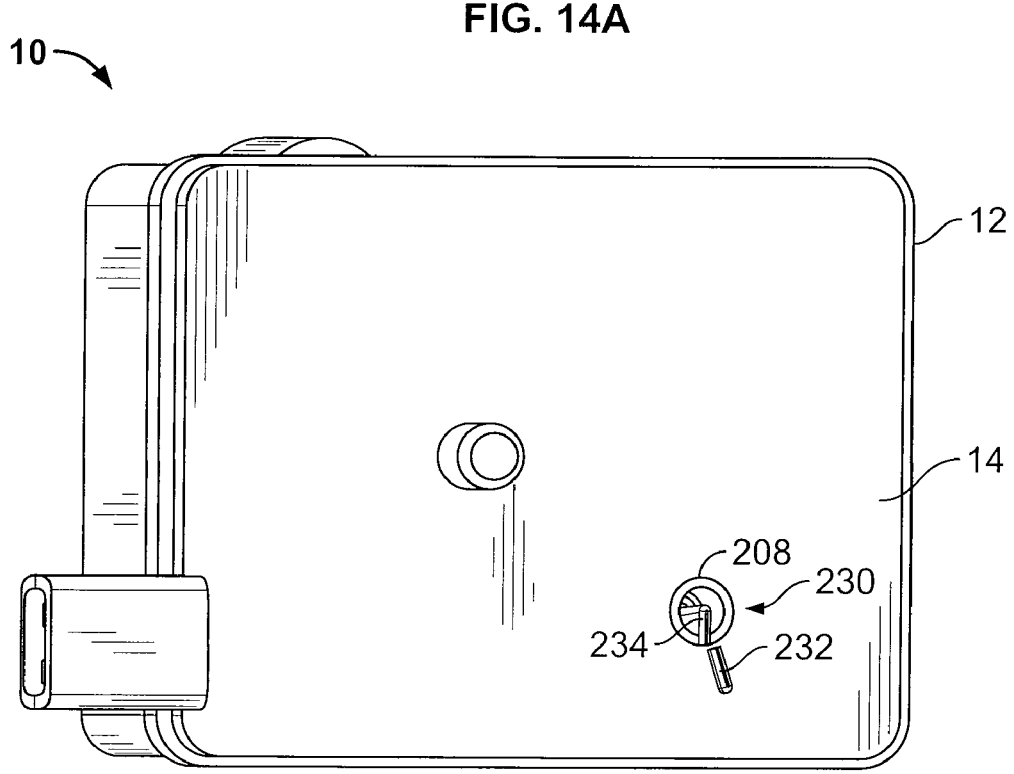
FIG. 14B is a back view of the sensor shown in FIG. 1 in a second operational position.

FIG. 14A is a back view of the sensor assembly 10 in the first operational position. FIG. 14B is a back view of the sensor assembly 10 in the second operational position. In the exemplary embodiment, the sensor 10 also includes an auto-calibration indicator 230 that enables an operator or installer to determine if the sensor 10 is in the home position, e.g. sensor 10 is in the calibrated position. The auto-calibration indicator 230 also includes an indicator line 232 on the cover 14 and an indicator line 234 on the axle of the movable contact assembly 30, also shown in FIGS. 11A and 11B. During operation, these indicator lines 232 and 234 are aligned when the sensor 10 is in home position and the contacts are closed as shown in FIG. 11A. As soon as the contacts open, the two indicator lines 232 and 234, are not aligned as shown in FIG. 14B. This feature acts as a visual aid to verify that the sensor calibration has been successfully accomplished.

Figure 15:
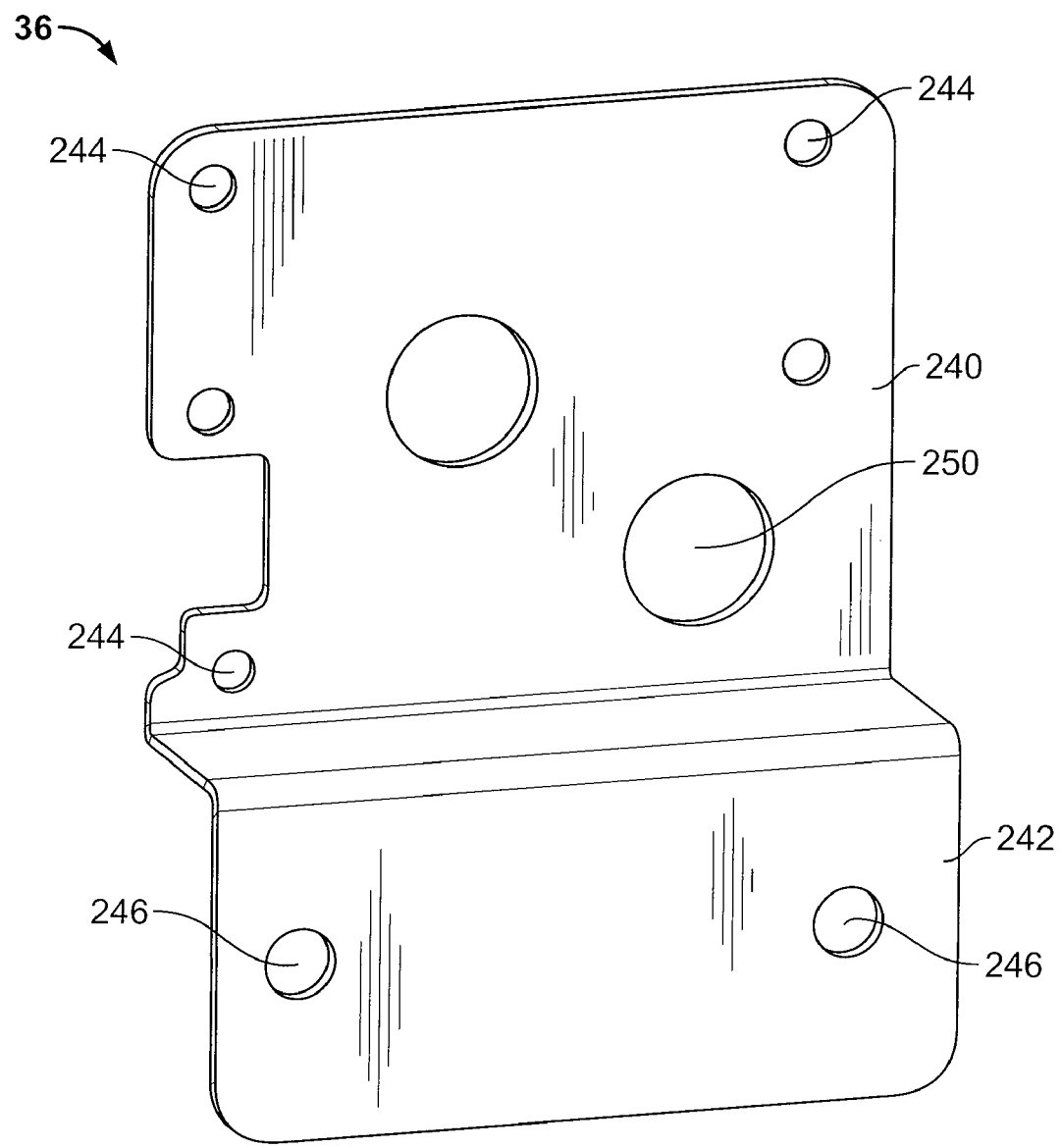
FIG. 15 is a front view of the mounting bracket shown in FIG. 2.

FIG. 15 is a front view of the exemplary mounting bracket 36 shown in FIG. 2. The mounting bracket 36 includes a first portion 240 and a second portion 242 that is formed unitarily with the first portion 240. The mounting bracket 36 also includes a first plurality of openings 244 that are sized to receive the mounting screws 38 shown in FIG. 2. The mounting screws 38 attach the mounting bracket 36 to the sensor assembly 10 as discussed above. The mounting bracket 36 also includes a second plurality of openings 246 that are each sized to receive a mounting screw (not shown). In the exemplary embodiment, the quantity and location of the openings 246 are based on the type of equipment the sensor 10 is to be coupled to. For example, if the sensor 10 is to be coupled to a lawnmower, then the quantity, size, and spacing of the openings 246 are fabricated to enable the sensor 10 to be mounted to that specific lawnmower. In the exemplary embodiment, the quantity, size, and spacing of the openings 246 are predetermined such that a specific mounting bracket 36 is fabricated for the specific equipment designated to receive the sensor 10 to enable the installer to easily install the sensor 10 without further adjustment with respect to the proper positioning of the sensor 10. After the sensor 10 is installed, the installer may easily calibrate the sensor 10 as described above. To assist the installer of sensor 10, the mounting bracket 36 also includes an opening 250 that enables the installer to observe the auto-calibration indicator 230.

The self-calibrating sensor described herein facilitates setting the physical relation between an object to be sensed and the point in the travel of a sensor probe at which a desired event occurs. That is, the sensor 10 facilitates calibration of devices which use mechanical motion as the means of input. The output device 30 may be a discrete event, such as a switch closure, or an analog output in the form of a resistance, voltage level, or pressure level. The above examples of outputs are typical, but not exhaustive.

In the exemplary embodiment, the sensor described herein is configured to function as a limit switch. The sensor detects movement of a surface in a specified direction from a neutral or rest position. The sensor detects a slight movement in the specified direction and opens an electrical circuit. When the object to be detected is in the neutral position, or in a position clockwise (as seen from the rear of the sensor 10) from the neutral position, the sensor circuit is closed.

Moreover, the sensor described herein may utilize linear motion or rotary motion, as an input to the sensor. When linear motion is utilized to operate the switch, the probe touching the object to be sensed is disposed on the end of a linear slide. A second parallel linear slide is then coupled to the switch or other output device. A spring preloads the second slide toward the home position. A second spring, acting in a direction normal to the first, preloads the two slides together, so that their motion is coupled. An activation element or device is used to separate the teeth that couple the two slides to perform auto-calibration of the sensor.

Additionally, the sensor described herein may utilize friction, electro-static attraction or magnetic attraction to couple the input and output devices, instead of using teeth. Separating the two moving members decreases or eliminates the coupling so that the pre-load spring accomplishes auto-calibration. Although, sensor 10 is described herein as outputting to an electrical contact assembly, sensor 10 may also output to a potentiometer or other analog electrical device, a digital encoder, a pneumatic or hydraulic valve (2-position device), a pneumatic or hydraulic pressure (analog), or to a mechanical motion device. Optionally, a switch shorting member may be coupled directly to the cam ring 20. Thus the sensor would not use a cam action and would be simpler to manufacture. Moreover, a variety of output forms may also be directly coupled to what is referred to herein as the cam ring, if end use requirements allowed. For example, the cam ring 20 may include resistive material tracks mounted on its face without teeth 132, such that, with wipers fixed to the cover 14, the ring functions as a potentiometer.

The sensor described herein permits calibrating the physical relation between the object to be sensed and the sensor without using any tools and in a shorter period of time than other sensors allow. The sensor also permits an individual to accomplish the calibration with very little training. Because of the minimal training requirements, the sensor reduces the time and cost of installing the sensor by field personnel or end-users. The sensor also provides a quick and easy visual verification that auto-calibration of the sensor has been accomplished.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A limit switch comprising:
   an electrical contact assembly;
   an actuating element configured to automatically reposition the electrical contact assembly to a calibrated position; and
   a cam ring having a slot formed thereon, the cam ring being configured to move the electrical contact assembly to the calibrated position based on an input received from the actuating element, the electrical contact assembly being configured to be at least partially inserted into the cam ring slot.

2. A limit switch in accordance with claim 1 further comprising:
   a housing;
   an input lever coupled to the housing and configured to contact a device to be sensed; and
   an output device;
   the actuating element configured to decouple the input lever from the output device and automatically reposition the output device to the calibrated position.

3. A limit switch in accordance with claim 2 wherein the cam ring is configured to move the output device to the calibrated position based on the input received from the actuating element.

4. A limit switch in accordance with claim 2 further comprising a lock ring coupled to the input lever, the lock ring being configured to engage the cam ring.

5. A limit switch in accordance with claim 2 wherein the output device comprises at least one of a voltage level output device, a resistance level output device, and a pressure level output device.

6. A limit switch in accordance with claim 2 wherein the electrical contact assembly slidably engages the cam ring, the cam ring being configured to reposition the electrical contact assembly based on an input received from either the actuating element or the input lever.

7. A limit switch in accordance with claim 6 further comprising a torsion spring configured to bias the cam ring in a predetermined direction.

8. A limit switch in accordance with claim 2 further comprising an indicator assembly, the indicator assembly comprising a movable indicator portion formed on the output device and a stationary portion formed on a housing cover plate, the indicator assembly indicates the operational position of the output device.

9. A limit switch in accordance with claim 1 wherein the actuating element is configured to decouple an input lever from the electrical contact assembly and automatically reposition the electrical contact assembly to the calibrated position.

10. A limit switch in accordance with claim 1 wherein the cam ring is configured to move the electrical contact assembly to the calibrated position based on an input received from the actuating element.

11. A limit switch in accordance with claim 1 further comprising a lock ring coupled to an input lever, the lock ring is configured to engage the cam ring.

12. A limit switch in accordance with claim 1 wherein the electrical contact assembly is coupled to the cam ring, the cam ring being configured to move the electrical contact assembly to the calibrated position based on an input received from the actuating element.

13. A limit switch in accordance with claim 1
wherein the cam ring is configured to move the electrical contact assembly to the calibrated position based on an input received from the actuating element; and the limit switch further comprises a torsion spring configured to bias the cam ring in a predetermined direction.

14. A limit switch in accordance with claim 1 wherein the cam ring is configured to move the electrical contact assembly to the calibrated position based on an input received from the actuating element, the electrical contact assembly being slidably engaged with the cam ring.

15. A self-calibrating sensor in accordance with claim 1 further comprising an indicator assembly, the indicator assembly comprising a movable indicator portion formed on the electrical contact assembly and a stationary portion formed on a housing cover plate, the indicator assembly configured to indicate the operational position of the electrical contact assembly.

16. A limit switch comprising:
a housing;
an input lever coupled to the housing and configured to contact a device to be sensed;
an output device;
an electrical contact assembly;
an actuating element configured to automatically reposition the electrical contact assembly to a calibrated position, the actuating element configured to decouple the input lever from the output device and automatically reposition the output device to the calibrated position;
a cam ring comprising a plurality of gear teeth, the cam ring being configured to move the output device to the calibrated position based on an input received from the actuating element; and
a lock ring comprising a plurality of gear teeth, the lock ring gear teeth being configured to mesh with the cam ring gear teeth to maintain an angular relationship between the input lever and the output device.

17. A limit switch in accordance with claim 16 further comprising a spring configured to engage the lock ring with the cam ring.

18. A limit switch comprising:
a housing;
an input lever coupled to the housing and configured to contact a device to be sensed;
an output device comprising an electrical contact assembly; and
an actuating element configured to automatically reposition the electrical contact assembly to a calibrated position, the actuating element configured to decouple the input lever from the output device and automatically reposition the output device to the calibrated position; and
a cam ring having a slot formed thereon, the electrical contact assembly being configured to be at least partially inserted into the cam ring slot, the cam ring being configured to reposition the electrical contact assembly based on an input received from at least one of the actuating element and the input lever.

19. A limit switch comprising:
an electrical contact assembly;
an actuating element configured to automatically reposition the electrical contact assembly to a calibrated position;
an input lever configured to contact a device to be sensed;
a cam ring comprising a plurality of gear teeth, the cam ring being configured to move the electrical contact assembly to the calibrated position based on an input received from the actuating element; and
a lock ring comprising a plurality of gear teeth, the lock ring gear teeth being configured to mesh with the cam ring gear teeth to maintain an angular relationship between an input lever and the electrical contact assembly.

* * * * *